US012574885B2

(12) United States Patent
Li et al.

(10) Patent No.: US 12,574,885 B2
(45) Date of Patent: Mar. 10, 2026

(54) WIRELESS RESIDENTIAL GATEWAY AND INDOOR BASE STATION

(71) Applicant: ZTE Corporation, Shenzhen (CN)

(72) Inventors: Wenting Li, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 338 days.

(21) Appl. No.: 18/140,421

(22) Filed: Apr. 27, 2023

(65) Prior Publication Data

US 2023/0262642 A1     Aug. 17, 2023

Related U.S. Application Data

(63) Continuation of application No. PCT/CN2020/126664, filed on Nov. 5, 2020.

(51) Int. Cl.
| | |
|---|---|
| *H04W 60/04* | (2009.01) |
| *H04W 12/72* | (2021.01) |
| *H04W 48/10* | (2009.01) |
| *H04W 48/16* | (2009.01) |
| *H04W 12/04* | (2021.01) |
| *H04W 88/08* | (2009.01) |
| *H04W 88/16* | (2009.01) |

(52) U.S. Cl.
CPC ........... *H04W 60/04* (2013.01); *H04W 12/72* (2021.01); *H04W 48/10* (2013.01); *H04W 48/16* (2013.01); *H04W 12/04* (2013.01); *H04W 88/08* (2013.01); *H04W 88/16* (2013.01)

(58) Field of Classification Search
CPC .................................................... H04W 60/04
USPC ...................................................... 455/435.1
See application file for complete search history.

(56) References Cited

U.S. PATENT DOCUMENTS

| | | | | |
|---|---|---|---|---|
| 2009/0104905 A1* | 4/2009 | DiGirolamo | .......... | H04W 48/16 |
| | | | | 455/434 |
| 2011/0177814 A1* | 7/2011 | Buchmayer | ........... | H04W 48/02 |
| | | | | 455/435.1 |
| 2018/0007564 A1* | 1/2018 | Li | ......................... | H04W 76/00 |

FOREIGN PATENT DOCUMENTS

| | | |
|---|---|---|
| CN | 101754297 A | 6/2010 |
| CN | 104754738 A | 7/2015 |

(Continued)

OTHER PUBLICATIONS

International Search Report and Written Opinion for International Application No. PCT/CN2020/126664, mailed on Jul. 27, 2021, 6 pages.

(Continued)

*Primary Examiner* — Qutbuddin Ghulamali
(74) *Attorney, Agent, or Firm* — Perkins Coie LLP

(57) ABSTRACT

This patent document describes, among other things, techniques, and apparatuses for providing a residential gateway and/or indoor base station to improve wireless network efficiency and performance. In one aspect, a method of wireless communication is disclosed. The method includes receiving, at a wireless device from a base station, base station information comprising an identifier, wherein the base station information indicates that the base station is an indoor small base station. The method further includes determining, at the wireless device, whether the indoor small base station can be accessed based on the identifier. The method includes triggering, by the wireless device, a registration procedure or a service request procedure with a network based on the identifier.

17 Claims, 17 Drawing Sheets

1400

Receiving, at a wireless device from a base station, base station information comprising an identifier, wherein the base station information indicates that the base station is an indoor small base station — 1410

Determining, at the wireless device, whether the indoor small base station can be accessed based on the identifier — 1420

Triggering, by the wireless device, a registration procedure or a service request procedure with a network based on the identifier — 1430

(56)    References Cited

FOREIGN PATENT DOCUMENTS

| | | | |
|---|---|---|---|
| CN | 106165466 | A | 11/2016 |
| CN | 110892755 | A | 3/2020 |
| WO | 2009043002 | A2 | 4/2009 |
| WO | 2009088703 | A1 | 7/2009 |
| WO | 2020034378 | A1 | 2/2020 |

OTHER PUBLICATIONS

KPN et al., "FS_Resident Use case Base Station QoS," 3GPP TSG SA WG1 #91e, Electronic Meeting, S1-203076, Aug. 24-228, 2020, 2 pages.
International Preliminary Report on Patentability issued in International Application No. PCT/CN2020/126664, dated May 8, 2023, 4 pages.
European Search Report issued in EP Patent Application No. 20960295.2, dated Nov. 3, 2023, 13 pages.
3GPP TR 22.858 V0.1.0 (Aug. 2020), Technical Report, 3rd Generation Partnership Project; Technical Specification Group Services and System Aspects; Study of Enhancements for Residential 5G; Stage 1 (Release 18), 25 pages.
CNIPA, First Office Action for Chinese Application No. 202080106902.7, mailed on May 12, 2025, 18 pages with unofficial English translation.
CNIPA, Decision of Rejection for Chinese Application No. 202080106902.7, mailed on Jan. 13, 2026 with Google English translation, 16 pages.

* cited by examiner

```
SIB1 ::=         SEQUENCE {

...

cellAccessRelatedInfo              CellAccessRelatedInfo,

...}

CellAccessRelatedInfo   ::=        SEQUENCE { plmn-IdentityList               PLMN-IdentityInfoList, cellReservedForOtherUse         ENUMERATED {true}        OPTIONAL,    -- Need R

...,

[[ cellReservedForFutureUse-r16    ENUMERATED {true}        OPTIONAL,    -- Need R smallCell-IdentityInfoList-r17    SmallCell-IdentityInfoList-r17  OPTIONAL -- Need R

]]}

SmallCell-IdentityInfoList-r17 ::=    SEQUENCE (SIZE (1..maxSmallCell-r17)) OF SmellCell-
IdentityInfo-r17

SmellCell-IdentityInfo-r17 ::=        SEQUENCE { smellCell-Identity-r17        SmallCellIdentity, trackingAreaCode-r17          TrackingAreaCode, ranac-r17                     RAN-AreaCode           OPTIONAL,        -- Need R cellIdentity-r17              CellIdentity,

}

SIBx-r17 ::=            SEQUENCE { smallCell-List-r17        smallCell-List-r17             OPTIONAL,    -- Need R lateNonCriticalExtension   OCTET STRING                  OPTIONAL,    ...} smallCell-List-r17 ::=            SEQUENCE (SIZE (1..maxSmallCell-r17)) OF smallCell-r17 smallCell-r17 ::=            SEQUENCE { smallCellname-r17   OCTET STRING (SIZE(1.. maxSmallCellname-Len-r17}) OPTIONAL-- Need
R}CellReservedForOtherUse/  cellReservedForFutureUse-r16
```

For the indoor small base station, these two elements were set to TRUE  to bar the UE doesn't support or disable the indoor small base station featureSmallCellIdentity:

The small cell Identity could be a bit string to indicate the Identity of the indoor small cell/base station , or just a bit to indicate it's a indoor small cell/base station, smallCellname The network name string of the indoor small cell/base station.

FIG. 2

```
SIB1 ::=          SEQUENCE {

...

cellAccessRelatedInfo                    CellAccessRelatedInfo,

...}

CellAccessRelatedInfo    ::=           SEQUENCE { plmn-IdentityList                     PLMN-IdentityInfoList, cellReservedForOtherUse               ENUMERATED {true}        OPTIONAL,    --
Need R

...,

[[ cellReservedForFutureUse-r16          ENUMERATED {true}        OPTIONAL,    --
Need R smallCell-IdentityInfoList-r17     SmallCell-IdentityInfoList-r17  OPTIONAL -
- Need R

]]}

SmallCell-IdentityInfoList-r17 ::=     SEQUENCE (SIZE (1..maxSmallCell-r17))
OF SmellCell-IdentityInfo-r17

SmellCell-IdentityInfo-r17 ::=          SEQUENCE { smellCell-Identity-r17               SmallCellIdentity, trackingAreaCode-r17                 TrackingAreaCode, ranac-r17                            RAN-AreaCode         OPTIONAL,        --
Need R cellIdentity-r17                     CellIdentity, smallCellname-r17     OCTET STRING (SIZE(1.. maxSmallCellname-Len-r17))
OPTIONAL-- Need R}}CellReservedForOtherUse/   cellReservedForFutureUse-r16
```

For the indoor small base station, these two elements were set to TRUE  **to bar
the UE doesn't support or disable the indoor small base station
feature**SmallCellIdentity:

The small cell Identity could be a bit string to indicate the , or just a bit
to indicate it's a indoor small cell/base station, smallCellname The network name string of the indoor small cell/base station.

UE NAS layer

UE NAS indicate the category that indicate it has no password or not a member

UE AS layer

| Security Header for the RG | Security header for the 5GC | Registration Message Content |
|---|---|---|

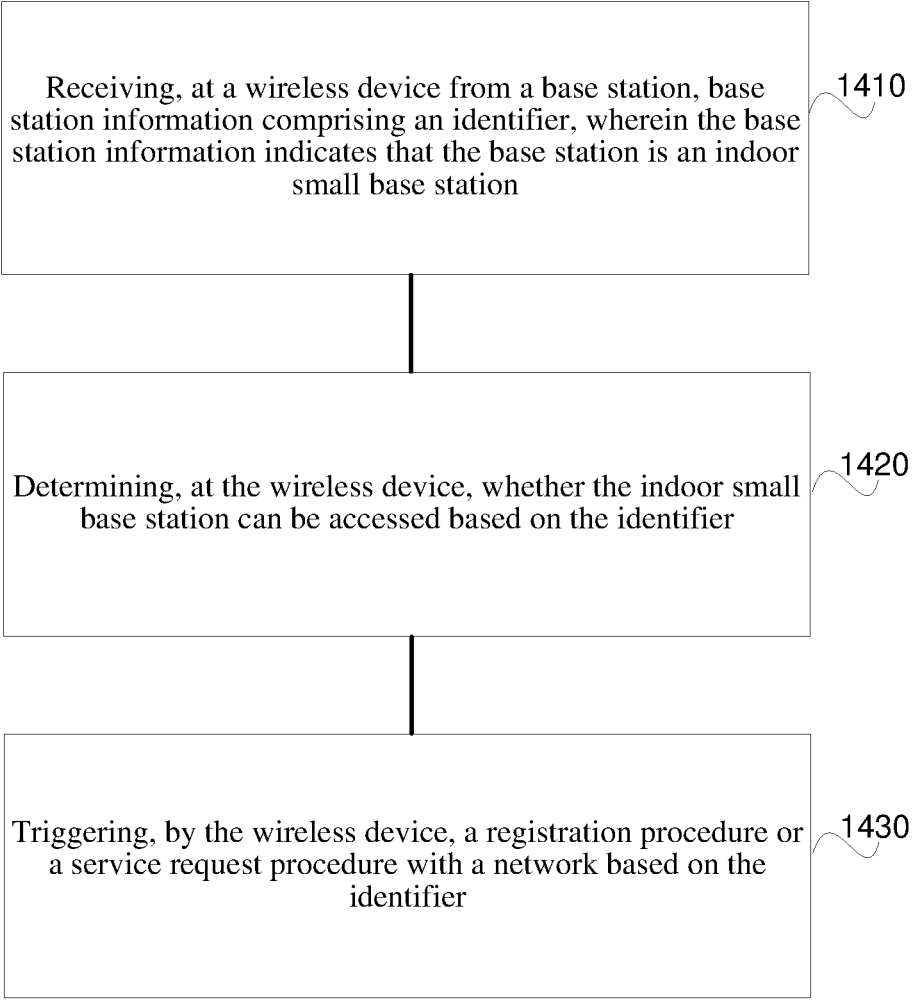

Receiving, at a wireless device from a base station, base station information comprising an identifier, wherein the base station information indicates that the base station is an indoor small base station                    1410

Determining, at the wireless device, whether the indoor small base station can be accessed based on the identifier                    1420

Triggering, by the wireless device, a registration procedure or a service request procedure with a network based on the identifier                    1430

Setting, by a network node in system information, indoor small base station information;                    1510

Transmitting, from the network node to a wireless device, the system information indicating the network node is the indoor small base station                    1520

1600

WIRELESS RESIDENTIAL GATEWAY AND INDOOR BASE STATION

CROSS-REFERENCE TO RELATED APPLICATIONS

This application is a continuation of International Patent Application No. PCT/CN2020/126664, filed on Nov. 5, 2020, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques, and apparatuses for providing a residential gateway and/or indoor base station to improve wireless network efficiency and performance.

In one aspect, a method of wireless communication is disclosed. The method includes receiving, at a wireless device from a base station, base station information comprising an identifier, wherein the base station information indicates that the base station is an indoor small base station. The method further includes determining, at the wireless device, whether the indoor small base station can be accessed based on the identifier. The method includes triggering, by the wireless device, a registration procedure or a service request procedure with a network based on the identifier.

In another aspect, another method for wireless communications is disclosed. The method includes setting, by a network node in system information, indoor small base station information. The method further includes transmitting, from the network node to a wireless device, the system information indicating the network node is the indoor small base station.

In another aspect, a wireless communication apparatus comprising a processor configured to implement a method described herein is disclosed.

In another aspect, computer readable medium including executable instructions to implement a method described herein is disclosed.

These, and other, aspects are described in the present document.

BRIEF DESCRIPTION OF DRAWINGS

FIG. 2 shows an example of abstract syntax notation one (ASN.1) for system information, in accordance with some example embodiments.

FIG. 3 shows an example of an ASN.1 codec for including a network name string in a system information block.

FIG. 13 shows an example of a security header.

FIGS. 14-15 show examples of a processes.

DETAILED DESCRIPTION

Figure 1:
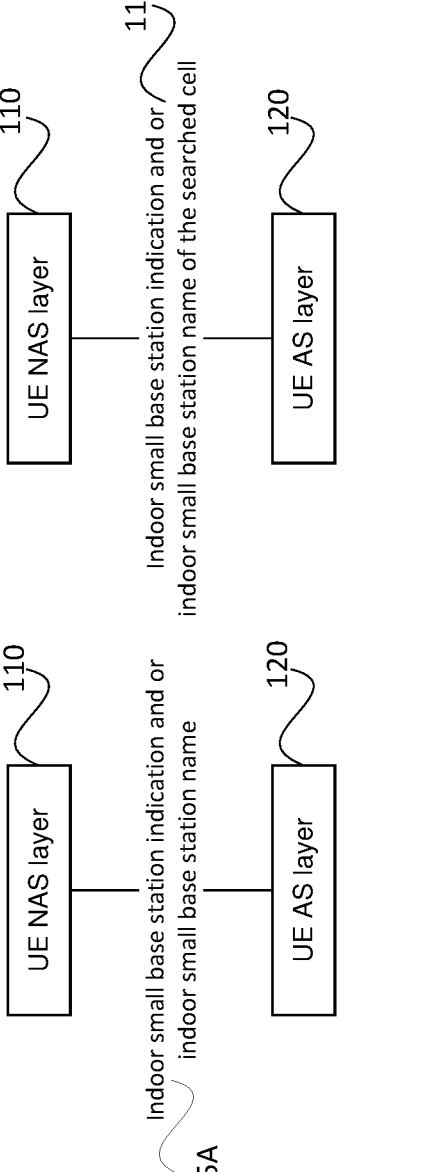
FIG. 1 shows an example of interaction between the access stratum (AS) and a non-access stratum (NAS).

Certain features are described using the example of Fifth Generation (5G) wireless protocol. However, applicability of the disclosed techniques is not limited to only 5G wireless systems.

Many cellular network operators have both mobile network and fixed network operations. Many operators provide service combining mobile communication, fixed telephony, and broadband Internet, and some providers television service as well. Operators can distinguish themselves by providing an optimal integration between the different services. Following the trend of wire line/wireless convergence, operators are integrating their fixed and mobile networks into a single core network with fixed and mobile access networks.

To accommodate increasing amounts of data being sent using 5G requires higher frequencies where it is increasingly difficult to provide outdoor-to-indoor coverage in residential areas. Disclosed is a solution using small indoor base-stations that provide/improve coverage within the home. These small indoor base stations may either operate in collaboration with a fixed network operator or may operate independently.

Currently, fixed broadband services work on a different premise than mobile services. each device using a mobile service is known and identifiable in the mobile network. Services can then be provided to specific devices and not to other devices. With fixed broadband services, the operator provides Internet access to a residential gateway. Behind residential gateway is usually a LAN, but individual devices on that LAN are not known or identifiable in the core network. For an integrated fixed broadband/mobile residential 5G system devices behind the residential gateway can also be known and identified in the core network. A wireline/wireless convergence may use a single 5G core network to also control fixed broadband access.

An indoor small base station may address enhancements for indoor small base stations including evaluation of existing concepts to identify how to improve the use of indoor small base stations in 5G residential use cases, determine the applicability for use with indoor small base stations in 5G residential use cases of concepts like private slices, Standalone Non-Public Network (SNPN), Closed Access Group (CAG) as specified for non-public networks. Described below are a residential gateway and an indoor small base station.

User equipment (UEs) can be divided into 4 types described below. Service priority may be granted based on the type of the UE.

Type 1: A UE which shares the same Public Land Mobile Network (PLMN) as an indoor base station and the charging for service is on the base station.

Type 2: UE from a visited PLMN (VPLMN) and the charging for service is on the base station.

Type 3: UE that can access this network but is charged independent of the indoor base station Type 4: Devices without a subscriber identity module (SIM) card.

Initial Access

For initial access, an issue is whether the legacy UE can access the indoor small base station. If the legacy US is allowed, there would be no impact on the initial access. For a legacy UE, it will see the indoor small base station as a normal base station and try to access it normally. The access control can be done at the residential gateway (RG). An advantage is that access has no limitation based on the UE's version. The UE may just need to download an application (APP), then the RG may be able authenticate the UE with a shared key. However, as more and more indoor base stations are deployed, it will affect the cell selection and initial access of the non-member UEs significantly. These UEs have no information indicating an indoor base station until the authentication from the RG has failed.

In some example embodiments, the indoor small base station only supports UEs supporting the indoor small base station access feature. For the other UEs, access by the indoor small base station is barred. To ensure that the indoor small base station can only be accessed by UEs that support indoor small base stations, the indoor small base station can broadcast an identity indication and set the legacy field as barred. For example, cellBarred in the MIB, or the cellReservedForOtherUse/cellReservedForFutureUse-r16 in SIB1 can be set to barred. Then for the UEs that support indoor small base stations can ignore the legacy field and check the identity of the indoor small base station.

In some example embodiments, the indoor small base station sets the legacy field to be TRUE to bar the UE that does not support or disable the indoor small base station feature (e.g. cellBarred in the MIB, or the cellReserved-ForOtherUse/cellReservedForFutureUse-r16 in SIB1.)

In some example embodiments, the UE supports and enables the indoor small base station, ignores the legacy field, and checks the identity of the indoor small base station.

If the non-access stratum (NAS) layer indicates to the UE side to search for an indoor small base station, the access stratum (AS) will begin to search for the indoor small base station, the AS may ignore the legacy field (cellBarred in the MIB, or the cellReservedForOtherUse/cellReservedForFutureUse-r16 in SIB1). Otherwise, the AS treats the indoor small base station feature as disabled and the UE checks the legacy field normally.

In some example embodiments, the UE enables the indoor small base station feature after receiving the indoor small base station selection indication from the NAS layer.

Interaction Between Access Stratum (AS) and Non-Access Stratum (NAS)

FIG. 1 shows an example of interaction between the AS and the NAS. At 115A, US NAS 110 transmits an indoor small base station indication and base station name to UE AS 120. At 115B, UE AS 120 transmits the indoor small base station indication and/or indoor small base station name of the searched cell to NSA 120.

Private slices, SNPN, and CAG scheme require the UE to have a related subscription. For the indoor small base station owner or smart home devices that belong to the indoor small base station it is inconvenient for customers to need to have a subscription. Furthermore, for visitors it is impractical to have a subscription. However, some SNPN/CAG ideas can be used such as broadcasting an indoor base station indication and a UE predefined network name. Then the UE that support indoor small base stations can match the network name to decide whether this indoor small base station can be accessed.

In some example embodiments, the indoor small base station can broadcast an indoor base station indication (can be implicit) and/or a network name as an identification. A UE that supports and has enabled the indoor small base station feature can match the network name to decide whether the indoor small base station can be accessed.

Abstract Syntax Notation One (ASN.1) of System Information

FIG. 2 shows an example of abstract syntax notation one (ASN.1) for system information, in accordance with some example embodiments.

In FIG. 2, for the indoor small base station, CellReserved-ForOtherUse and cellReservedForFutureUse-r16 are set to TRUE to bar the UE that does not support the indoor small base station feature or has the feature disabled.

The small cell Identity (e.g., SmallCellIdentity) can be a bit string indicating the identity of the indoor small cell/base station, or one bit to indicate that the base station is an indoor small cell/base station.

The network name string of the indoor small cell/base station is smallCellname.

In a non-public network (NPN), the network name can be broadcast in a separate message and can be used in a manual mode. For an indoor small base station, the system configuration can be simpler than a normal cell, and normally only one network name is needed. This has a practical benefit in terms of fast access aspect when the network name is broadcast in SIB1.

The network name can be broadcast in the SIB1 for the fast access.

Including the Network Name String in System Information Block (SIB)

FIG. 3 shows ASN.1 codec for including the network name string in SIB1. For a UE with type 1, 2, or 3, the UE can input the preferred network name directly. For the devices of type 4, the devices can connect a smart phone with the Bluetooth and set the preferred network name through the smart phone.

If the NAS layer indicates to select the indoor small base station, the AS takes the indoor small base station info in the system information into consideration for the cell selection and re-selection.

Access Control

For access control, it must be determined whether unified access control (UAC) is needed for the small base station.

Considering that a typical small base station may serve a limited number of UEs (e.g., 50), UAC may not be necessary but could be used. Furthermore, it is inconvenient for a customer to set UAC parameters.

For most cases the UAC is not needed. Even if needed, no change in UAC structure may be required.

Type 3 UEs can access the network but are charged independently from the indoor base station. As an illustrative example, take the clinic of the Doctor Joe where many patients may try to access the network through the indoor small base station. This may cause congestion to Doctor Joe's UE or medical devices in the office. To avoid this type of congestion, how many UEs are connected to the network and the service priority of type 3 UEs can be controlled by the network.

The UE may require information about its own type before initial access even though different UAC parameters can be configured for different UE types. One challenge is how the UE determines its type before a connection is made. Normally, type 1, 2, or 4 UE devices, will have the credential info/password of the indoor small base station while the type 3 does not. In other words, the type1/2/4 UE can pass the identity authentication of the indoor small base station/RG, while the type 3 UE cannot. The indoor small base station/ RG can determine the UE type based on an authentication result. This example is further detailed below.

Wireless Device Type Determination by Authentication Result

Figure 4:
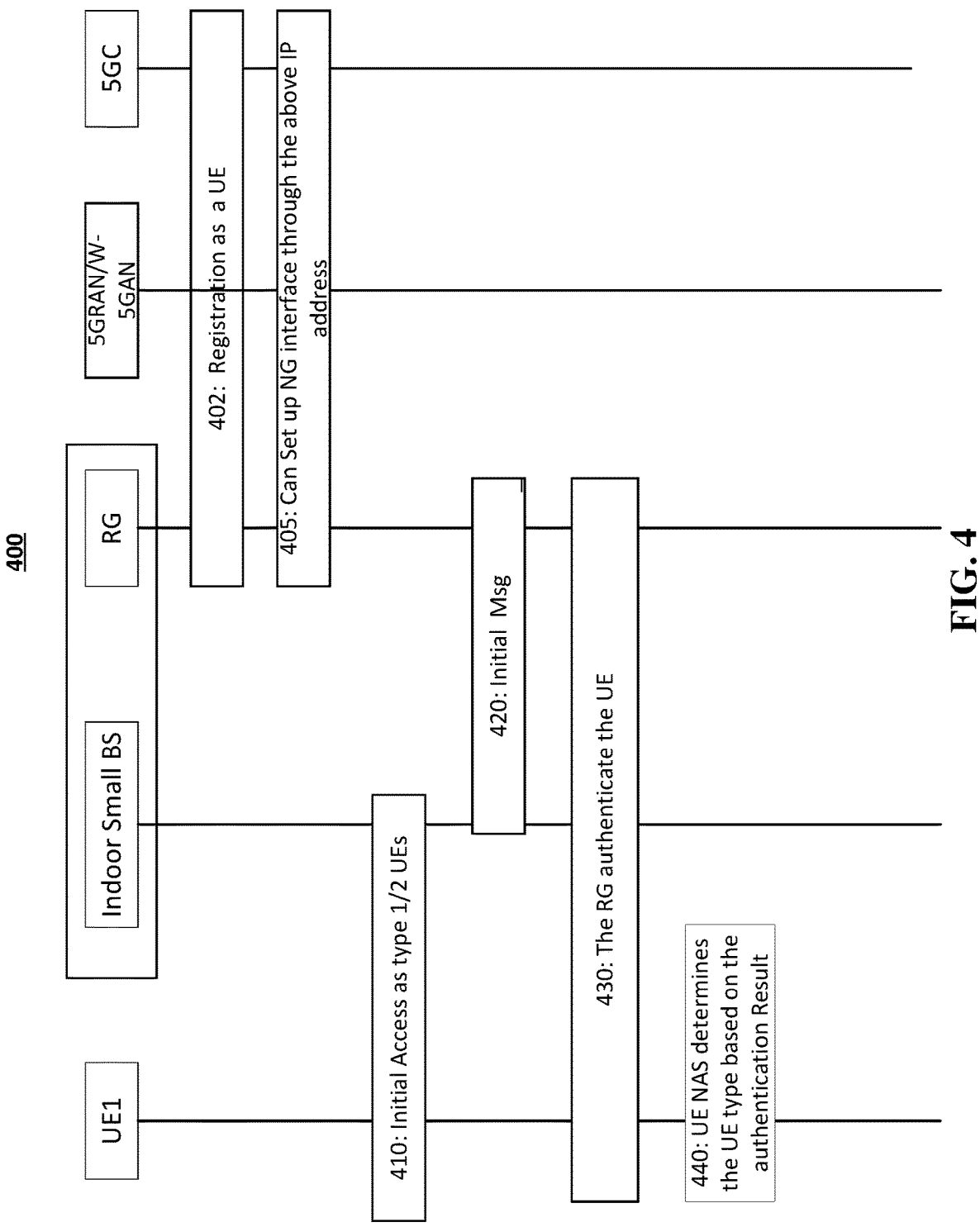
FIG. 4 shows an example of a message flow for wireless device type determination based on an authentication result.

FIG. 4 shows example message flow for UE type determination based on an authentication result. At 402, an RG registers with a 5G RAN. At 405, a NG interface can be set up through an IP address. At 410, UE1 establishes initial access as a type ½ UE. At 420, an initial message is sent. At 430, the RG authenticates the UE. At 440, the UE NAS determines a type for the UE based on an authentication result.

Another method for determining a UE type is based on whether the UE has password or not. Another method is to adopt the UAC only after the UE has determined its type, e.g. indoor small base station/RG authentication failure, then the UE can set itself as a type 3 UE and begin to adopt the UE-type based UAC parameters. If all the foregoing methods fail, to avoid congestion, the network can release one or more connected type 3 UEs when congestion occurs.

The following 3 methods can be considered for the type 3 UE access control.

Password Method

The UE can determine its type based on whether it has a password (or other attributes), and further can determine the UAC parameters. A category can be defined for the case that the UE has no password or it has no authorization to enter this indoor small cell.

Unified Access Control (UAC) Method 1

Figure 5:
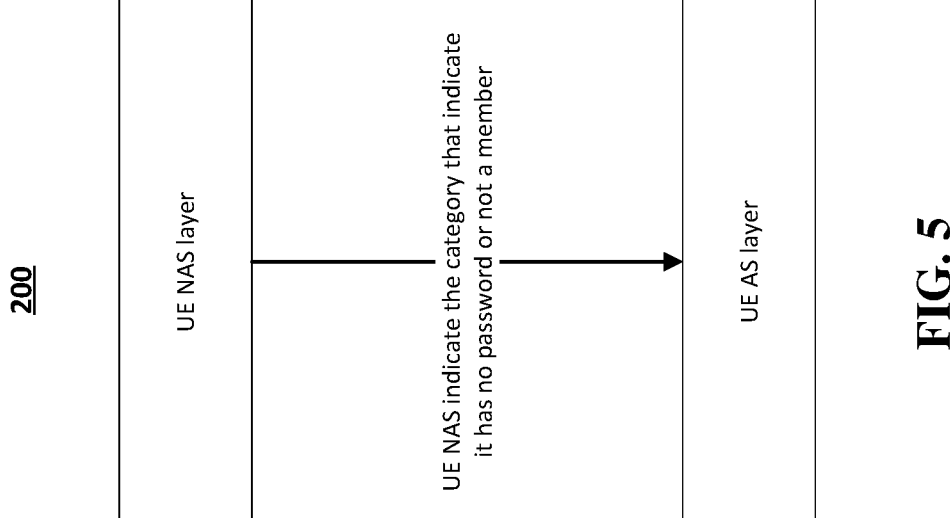
FIG. 5 shows an example of a message flow for UAC method 1.

As shown in FIG. 5, a UE-type based UAC can be adopted after the UE determines its type, e.g. after the RG authentication failure, the UE will take itself as Type 3 UE and adopt the corresponding UAC parameters.

UAC Method 2

Figure 6:
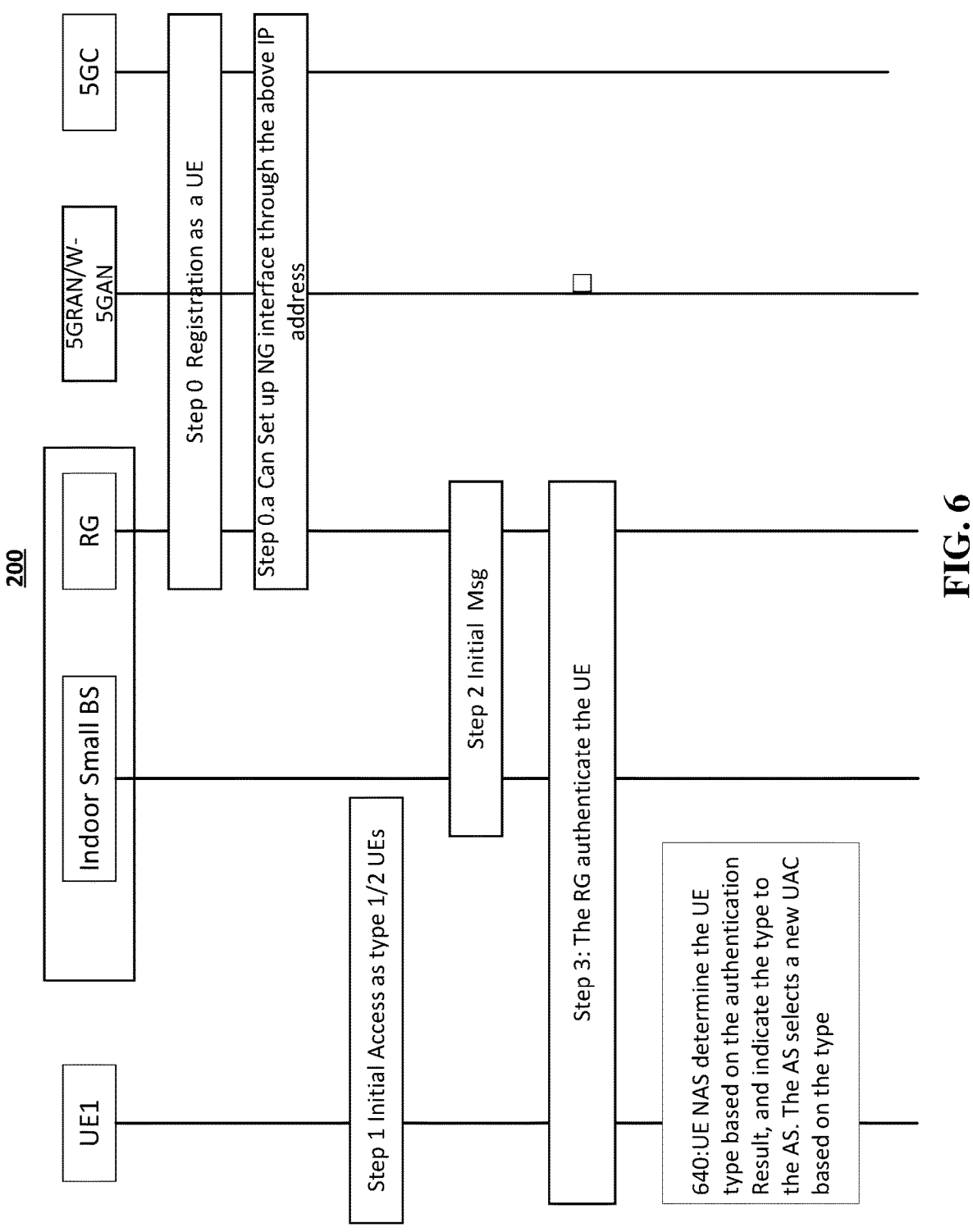
FIG. 6 shows an example of a message flow for UAC method 2.

FIG. 6 depicts an example message flow for UAC method 2. The message flow is similar to FIG. 4 except at 640 the NAS determines the UE type based on the authentication result and indicates the corresponding category to the AS and the AS selects a new UAC based on the type. No UE-type based UAC (initial access control), and once congestion happened, the small base station can release the connected Type 3 UE.

UAC Method 3

Figure 7:
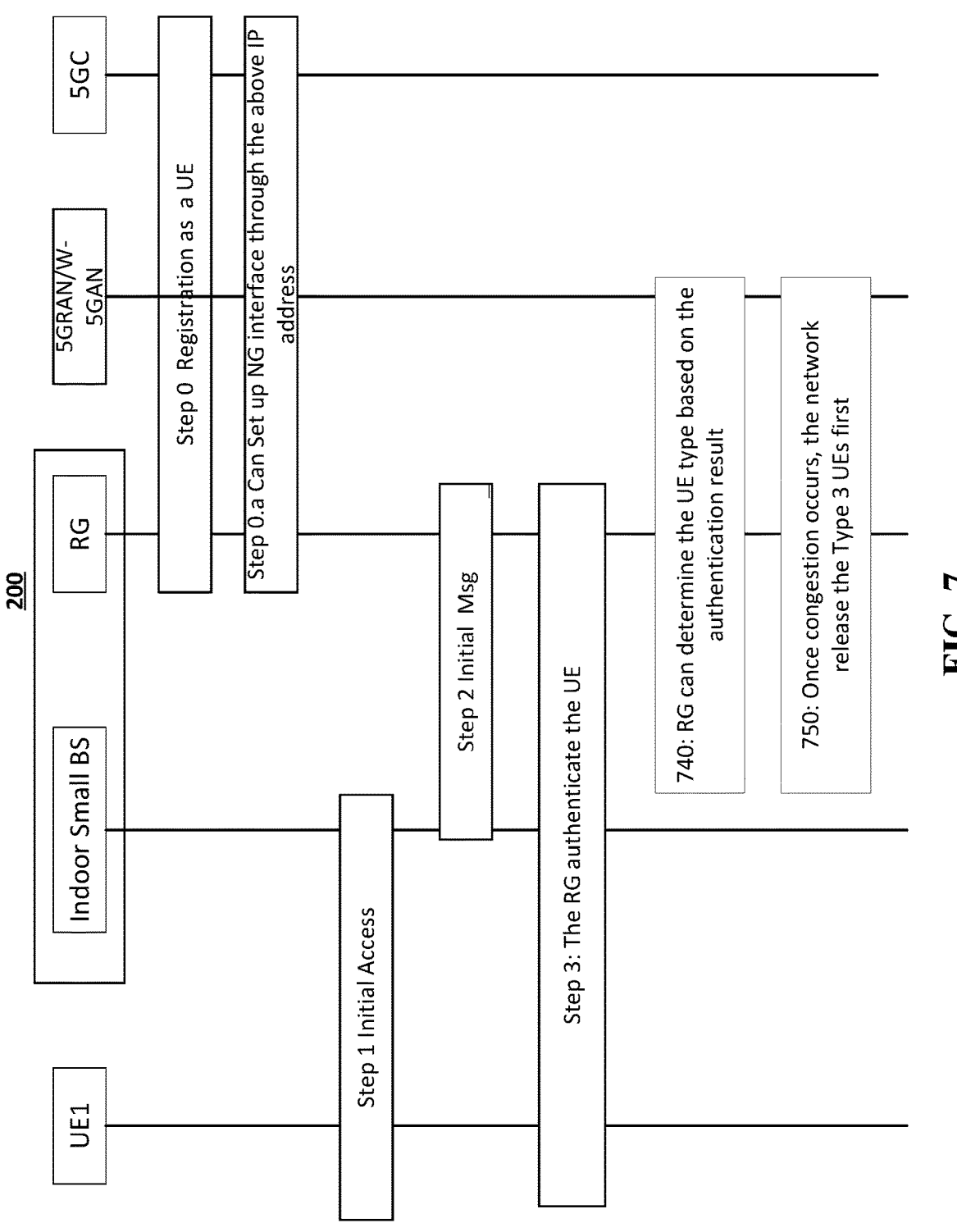
FIG. 7 shows an example of a message flow for UAC method 3.

In UAC method 3 shown at FIG. 7, the message flow is similar to FIGS. 4 and 5 except at 740, the RG determines the UE type based on the authentication result and once congestion occurs, the network releases UEs with type 3 first.

Registration Procedure with Different Wireless Device Types

Below is a short preliminary discussion based on a general NAS registration procedure. For the basic registration procedure with the 5G-RG, the following requirements shall be considered:

Devices behind the RG shall be known and identified in the core network

Mobility requirement: the mobility between indoor and outdoor shall be considered From the 5GC side, the legacy UE registration procedure can be be taken as an baseline, but there may be some differences for different UE types:

Type 1: Normal UE which share the same Plmn as the indoor base station and the charging was on the indoor base station Type 2: UE that from Vplmn and the charging was on the indoor base station Type 3: UE that can access this network but shall be charged independent from the indoor base station (including same PLMN subscribers and Vplmn subscribers)

Type 4: Devices without the SIM card.

General Registration Procedure for Wireless Device Types 1/2/3

For the first 2 UE types, the charging is based on the RG, for the third type UE, the charging would be based on the UE individually. Generally, the 5G-RG will authenticate the UE first, if successfully authenticated, the charging shall be based on the RG, otherwise shall be based on the UE individually. Thus, the registration procedure for the first 3 types UE could be as below: (For the 4th Type UE, it may even have no SIM card, which will be discussed separately).

Figure 8:
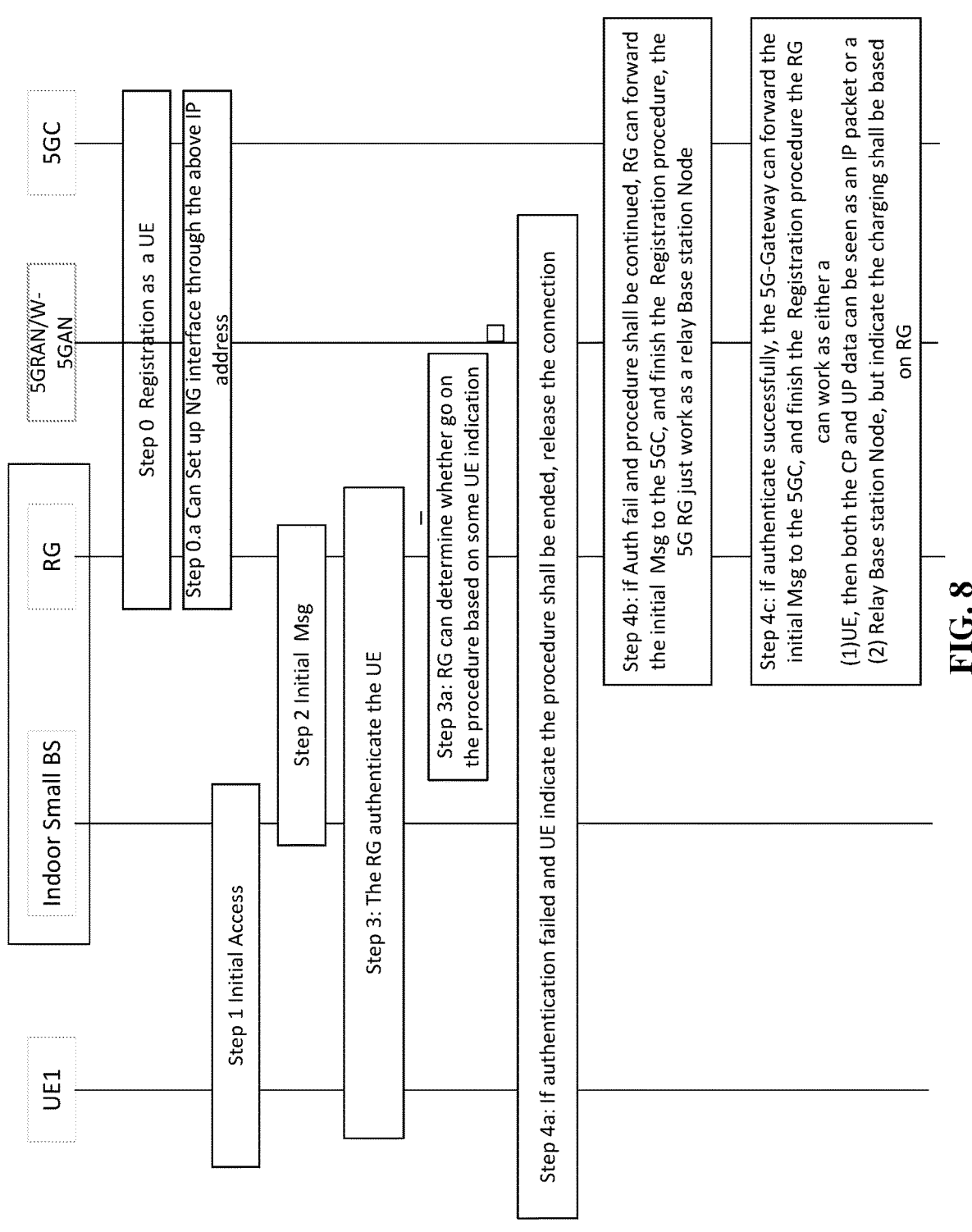
FIG. 8 shows another example of a message flow.

FIG. 8 shows an example message flow. At 802, the RG registers at the 5GC as a UE. At 805, the RG sets up a NG interface as a gNB through an IP address. At 810, the UE establishes initial access. At 829, the indoor small base station sends an initial message. At 830, the RG authenticates the UE. At 835, the RG determines whether to continue the procedure based on a UE indication. The indication can be included in a NAS message. At 840, if authentication failed and the UE indicates the procedure should be ended once an authentication failure, the connection is released. At 842, if the authentication failed and the procedure continued, the RG can forward the initial message to the 5GC, and finish the registration procedure and the RG performs as a relay base station node. At 845, if the authentication is successful, the RG can forward the initial message to the 5GC, and finish the registration procedure. The RG can work as (1) a UE, then both the CP and UP data can be seen as an IP packet, or (2) a relay base station node, but indicate the charging will be based on the RG which can be implemented by signaling between the RG and 5GC. The foregoing details a general procedure where 835 and 845(2) introduces a change to the UE NAS and CN.

For type 3 UEs (the UE without the password or authentication failed), the indoor small base station and the RG can work as a relay, and no further authentication procedure may be needed from the indoor small base station/RG. For some UEs, authentication from the indoor small base station is not needed.

As an optimization, the UE can indicate this info to the indoor small base station/RG in a NAS message or an AS message. If in the NAS message, the RG decodes the NAS message, while if in AS message, only need to add one indication to the message 5, then the indoor small base station/RG can forward the NAS message to the 5GC directly. Thus for the first 3 type, the network can distinguish the UE type by the authentication result and the indication in the message 5.

The UE can indicate the target node type (5GC/RG) in the message 5 or message 3 (cause value), if the target node is 5GC, the indoor small base station/RG can forward the Message to the 5GC directly.

General Registration Procedure for UE Type 4

For devices without a SIM card, a similar process to on-boarding a network of NPN can be adopted:

Step 1: Download the subscription through the on-boarding network

Step 2: Registration with the downloaded subscription.

For step 1, The subscription can be saved in the RG, or download from the 5GC with the IP connection between the 5GC and RG. Each RG can authenticate the devices with the default or the pre-configured key first, then for the UEs that successfully authenticated, the RG can configure the subscription to the UE.

For step 2: Once the devices get the subscription, the following action can be seen as the same as the type 1 UE.

The action of the type 4 UE is different from types 1/2/3. For type 4, the UE indicates it has no subscription explicitly or implicitly either in a NAS or an AS message.

Figure 9:
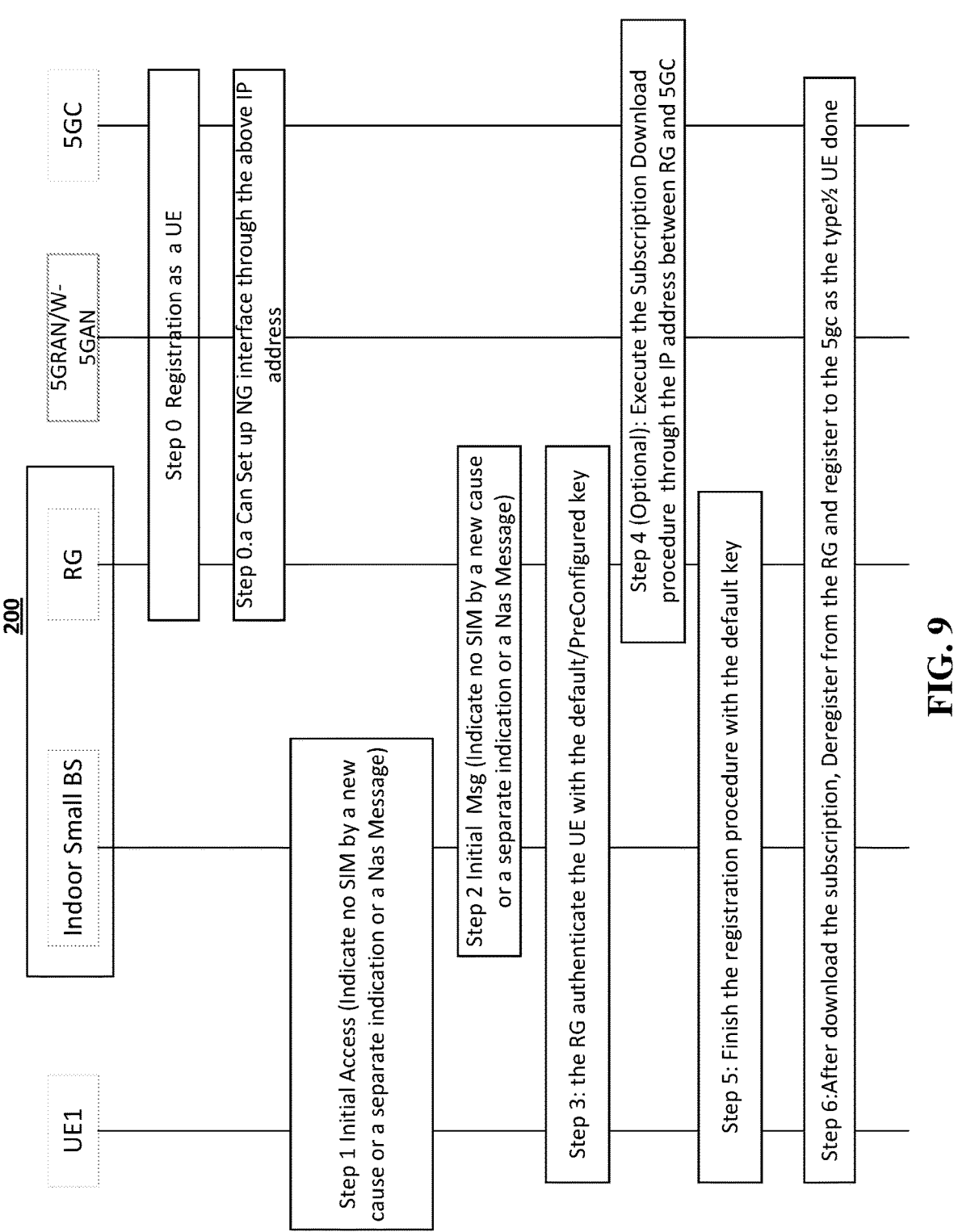
FIG. 9 shows an example of a general registration procedure for a type 4 wireless device.

The general registration procedure for the type 4 UE is shown in FIG. 9. At 902, the RG registers at 5GC as a UE. At 905, the RG sets up an NG interface as a gNB through an IP address. At 910, initial access and indicate no SIM by a new cause or a separate indication or a NAS Message. At 920, initial message and indicate no SIM by a new cause or a separate indication or a NAS Message. At 930, the RG authenticates the UE with a default/PreConfigured key. The default key can be set by connecting with smart-phone by Bluetooth. At 940, an optional step, the subscription can be saved at the RG, then the 5G-Gateway can allocate the right subscription based on the device type and the device type can be included in the NAS/AS message. If the subscription is not saved locally in the RG, the RG can execute a subscription download procedure through the IP address between the RG and 5GC. At 950, the registration procedure is finished with the default key. At 960, after downloading the subscription, deregister from the RG and register to the 5GC as type ½. From above description, we can see that for the type 4 UE the RG authenticates UE devices without a SIM card Residential Gateway Authentication Procedure According to the registration procedure, the RG needs to authenticate the Type 1/2/4 UEs and an example of a suitable authentication and security structure is shown below.

Figure 10:
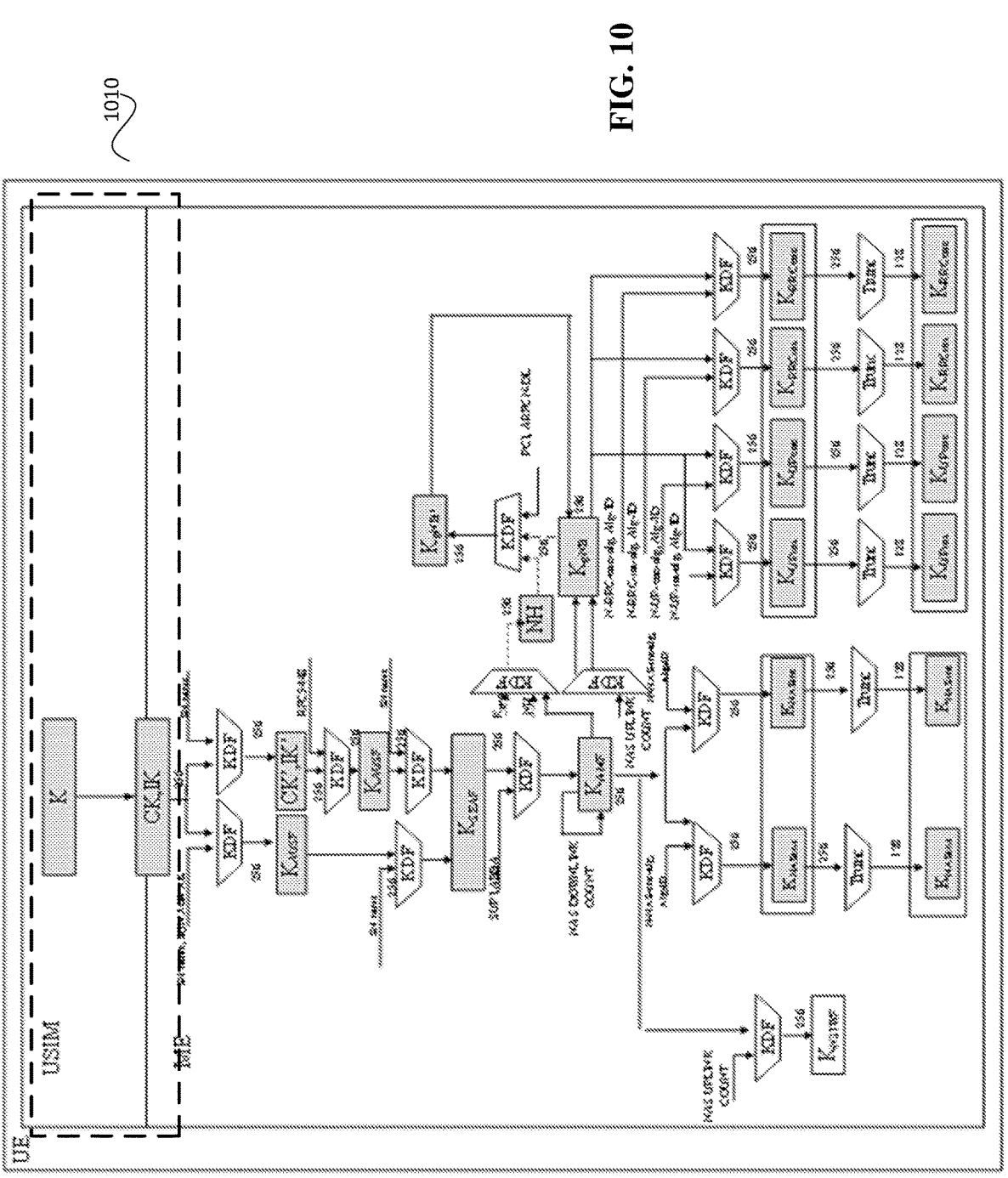
FIG. 10 shows an example of a key distribution and a key derivation scheme.

FIG. 10 shows an example of key distribution and key derivation scheme for 5G for the UE. The keys (CK/IK) can be generated through an algorithm in the USIM as shown in FIG. 10 at 1010. Then for the following signal/data transformation, the UE will use the key from the USIM as the root key.

Figure 11:
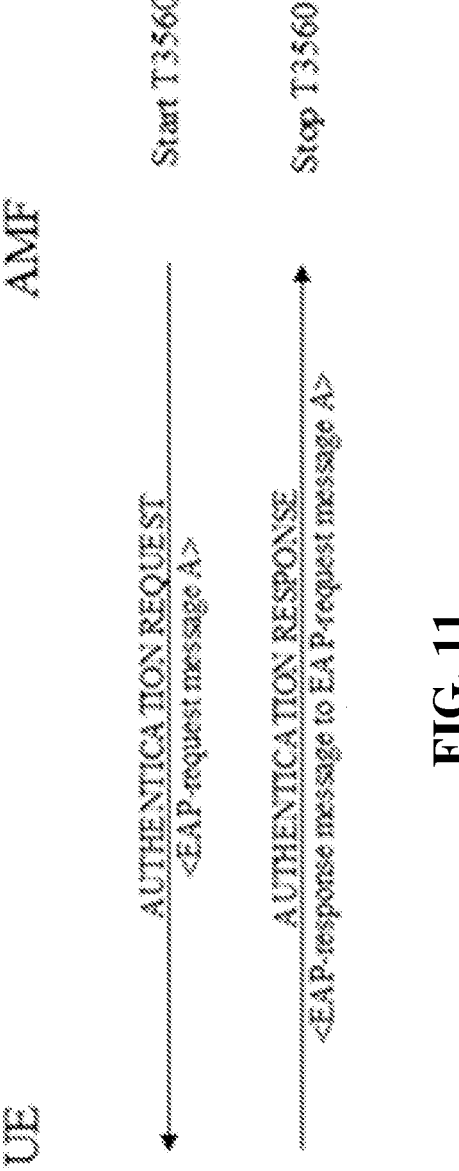
FIG. 11 shows an example of an authentication procedure.

FIG. 11 shows an example of an authentication procedure.

In the response message shown in FIG. 11, an authentication response message can be included. An algorithm for the authentication response is described below with respect to a RES* and XRES* derivation function.

When deriving RES* from RES, RAND, and a serving network name in the UE and when deriving XRES* from XRES, RAND, and the serving network name in the ARPF, the following parameters shall be used to form the input S to the KDF.

FC=0x6B,

P0=serving network name,

L0=length of the serving network name (variable length as specified in 24.501 [35]),

P1=RAND,

L1=length of RAND (i.e. 0x00 0x10),

P2=RES or XRES,

L2=length RES or XRES (i.e. variable length between 0x00 0x04 and 0x00 0x10).

The input key KEY shall be equal to the concatenation CK∥IK of CK and IK.

The serving network name shall be constructed as specified in clause 6.1.1.4.

The (X)RES* is identified with the 128 least significant bits of the output of the KDF.

Thus, the algorithm of authentication response parameters is based on the CK/IK. The UE and the RG can save/store the K or the CK/IK for authentication.

For a UE without a SIM, the RG will first authentication the UE with the pre-configured key, then download the subscription. For the credential info in the subscription, e.g. root K, there are 2 options:

Option 1: Send the K to the UE directly.

Option 2: The root key will not be sent to the UE, instead, once the 5GC send the authentication request message, the RG will calculate the CK/IK, and then send the authentication response message to the network while send the CK/IK to the UE. The advantage of this solution is that the root K will not be sent through the air interface between the UE and the RG. It's safer from the security aspect. Besides, the algorithm to derive the CK/IK from the root key is quite complex (35.206), it can also reduce the complexity from the UE side.

Figure 12:
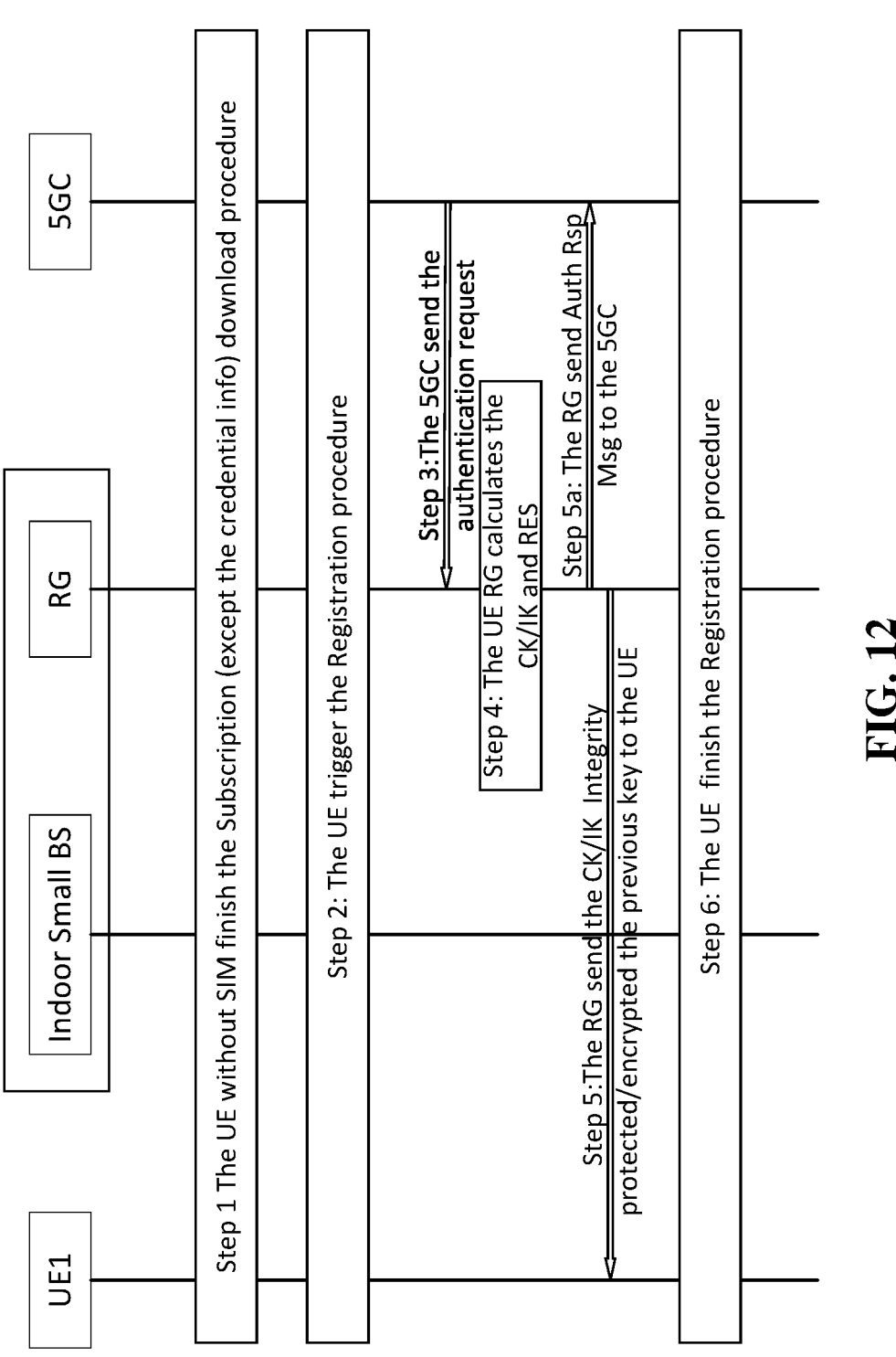
FIG. 12 shows an example of a message exchange for an authentication method.

FIG. 12 shows an example of a message exchange for an authentication method. At 1210, a UE without a SIM finishes a subscription (except the credential info) download procedure. At 1220 the UE triggers a registration procedure. At 1230, the 5GC sends the authentication request. At 1240, the UE RG calculates the CK/IK and RES. At 1250, the RG sends the CK/IK integrity protected/encrypted previous key to the UE. At 1255, the RG send an authentication response message to the 5GC. At 1260, the UE finishes the registration procedure. For the credential subscription download, for the credential info (e.g., root key), it can download the root K or only down load the CK/IK. Option 1 above may reduce the UE complexity compared to option 2.

Other Security Issues

Figure 13:
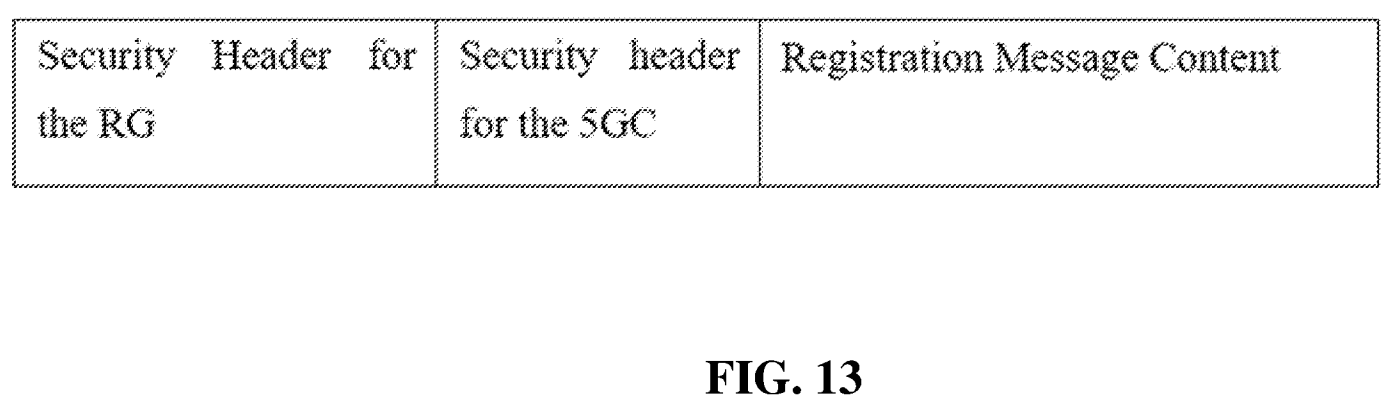

For the initial attach in the registration procedure, the network will authenticate the UE, then the UE will store the key. For the second registration, the UE can add integrity protection with the stored key. Then at the network side, if the integrity check is successful, the 5GC will not authenticate the UE again. According to the foregoing procedure, for the second access, the RG may determine whether another authentication failure is needed. A new security header shown in FIG. 13 may be added for the RG check. The security header may include fields including a security header for the RG, a security header for the 5GC, and registration message content.

FIG. 14 shows an example of a method 1400 for wireless communication. At 1410, in some embodiments of the disclosed technology, the method includes receiving, at a wireless device from a base station, base station information comprising an identifier, wherein the base station information indicates that the base station is an indoor small base station. At 1420, the method includes determining, at the wireless device, whether the indoor small base station can be accessed based on the identifier. At 1430, the method includes triggering, by the wireless device, a registration procedure or a service request procedure with a network based on the identifier.

Figure 15:
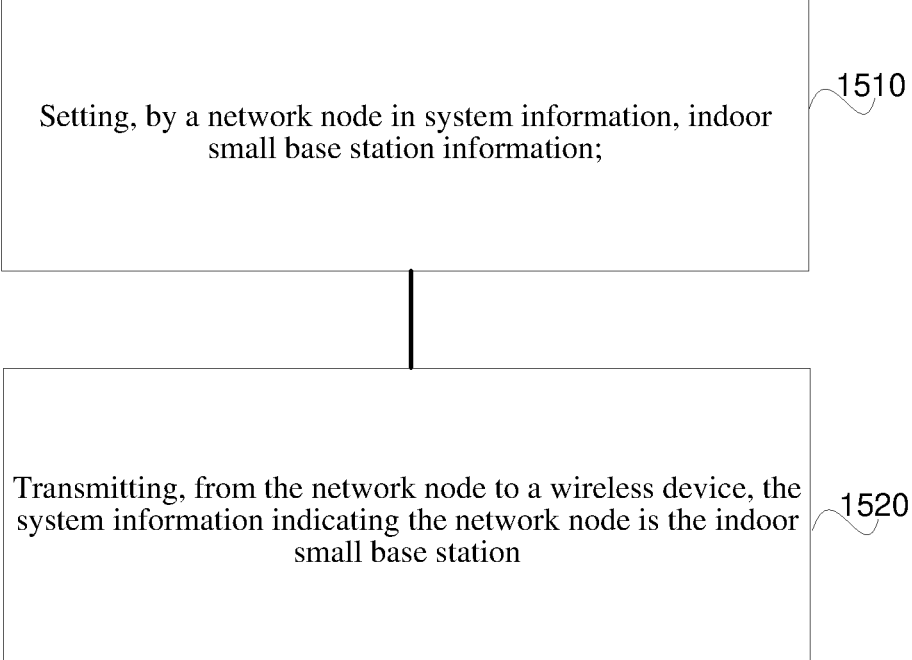

FIG. 15 shows another example of a method 1500 for wireless communication. At 1510, in some embodiments of the disclosed technology, the method includes setting, by a network node in system information, indoor small base station information. At 1520, the method includes transmitting, from the network node to a wireless device, the system information indicating the network node is the indoor small base station.

Figure 16:
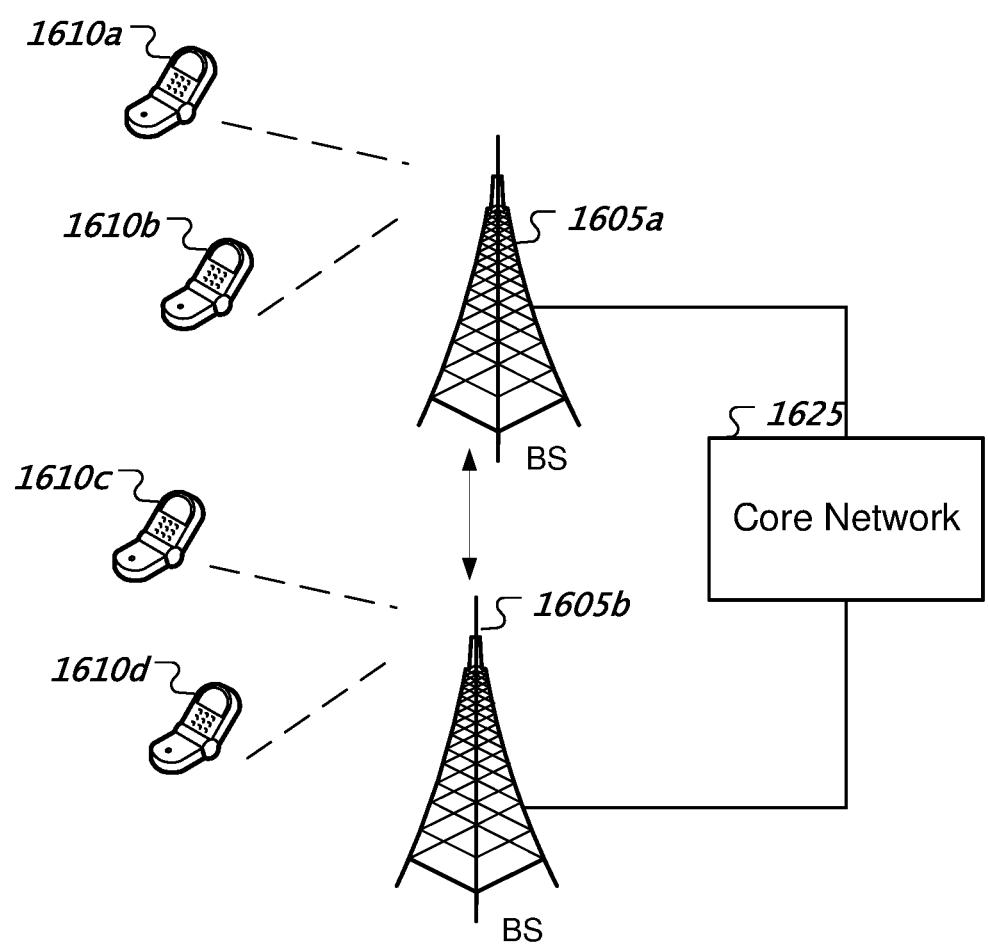
FIG. 16 shows an example of a wireless communication system in which one or more embodiments of the present technology can be applied.

FIG. 16 shows an example of a wireless communication system 1600 where techniques in accordance with one or more embodiments of the present technology can be applied. A wireless communication system 1600 can include one or more base stations (BSs) 1605a, 1605b, one or more wireless devices 1610a, 1610b, 1610c, 1610d, and a core network 1625. A base station 1605a, 1605b can provide wireless service to wireless devices 1610a, 1610b, 1610c and 1610d in one or more wireless sectors. In some implementations, a base station 1605a, 1605b includes directional antennas to produce two or more directional beams to provide wireless coverage in different sectors. The base station 1605a, 1605b may communicate directly with one another wirelessly or via a wired interface including a direct wired interface, a wired network, or the Internet.

The core network 1625 can communicate with one or more base stations 1605a, 1605b. The core network 1625 provides connectivity with other wireless communication systems and wired communication systems. The core network may include one or more service subscription databases to store information related to the subscribed wireless devices 1610a, 1610b, 1610c, and 1610d. A first base station 1605a can provide wireless service based on a first radio access technology, whereas a second base station 1605b can provide wireless service based on a second radio access technology. The base stations 1605a and 1605b may be co-located or may be separately installed in the field according to the deployment scenario. The wireless devices 1610a, 1610b, 1610c, and 1610d can support multiple different radio access technologies. The techniques and embodiments described in the present document may be implemented by the base stations described in the present document or by wireless devices.

Figure 17:
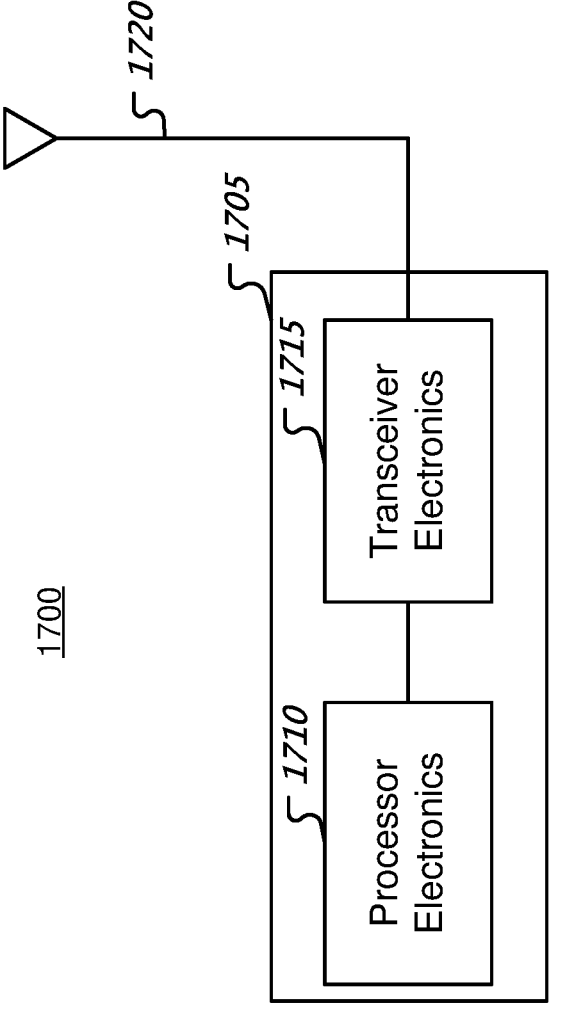
FIG. 17 is a block diagram representation of a portion of a radio station in which one or more embodiments of the present technology can be applied.

FIG. 17 is a block diagram representation of a portion of a radio station in accordance with one or more embodiments of the present technology can be applied. A radio 1705 such as a base station or a wireless device (or UE) can include electronics 1710 such as a microprocessor that implements one or more of the wireless techniques presented in this document. The radio 1705 can include transceiver electronics 1715 to send and/or receive wireless signals over one or more communication interfaces such as antenna 1720. The radio 1705 can include other communication interfaces for transmitting and receiving data. Radio 1705 can include one or more memories (not explicitly shown) configured to store information such as data and/or instructions. In some implementations, the processor electronics 1710 can include at least a portion of the transceiver electronics 1715. In some embodiments, at least some of the disclosed techniques, modules or functions are implemented using the radio 1705.

In some embodiments, the radio 1705 may be configured to perform the methods described in this document.

The technical solutions described by the following clauses may be preferably implemented by some embodiments.

Clause 1. A method of wireless communication, comprising: receiving, at a wireless device from a base station, base station information comprising an identifier, wherein the base station information indicates that the base station is an indoor small base station; determining, at the wireless device, whether the indoor small base station can be accessed based on the identifier; and triggering, by the wireless device, a registration procedure or a service request procedure with a network based on the identifier.

Clause 2. The method of wireless communication of clause 1, wherein the indoor small base station information is a one-bit indication that indicates that the base station is the indoor small base station or a name string for the indoor small base station.

Clause 3. The method of wireless communication of clause 2, further comprising: broadcasting, in a first system information block (SIB1) for the fast access, a network name or the one-bit indication.

Clause 4. The method of wireless communication of clause 1, wherein enabling communication between the wireless device and the indoor small base station is performed after determining that the wireless device is capable of interoperating with the indoor small base station.

Clause 5. The method of wireless communication of clause 3, wherein an access stratum (AS) layer of the wireless device determines that the wireless device is capable of interoperating with the indoor small base station after receiving an indoor small base station selection indication from a non-access stratum (NAS) layer.

Clause 6. The method of wireless communication of clause 1, further comprising: barring, by the wireless device, the wireless device based on a determination that the wireless device is not capable of interoperating with the indoor small base station.

Clause 7. The method of wireless communication of clause 1, further comprising: determining, by the wireless device that is not capable of interoperating with the indoor small base station, whether to bar access to the network based on legacy system information comprising a cellBarred in a master information block (MIB); or a cellReservedForOtherUse/cellReservedForFutureUse-r16 in a system information block 1 (SIB1).

Clause 8. The method of wireless communication of clause 1, further comprising: ignoring, by a wireless device capable of interoperating with the indoor small base station, a legacy field check comprising a cellBarred in a master information block (MIB); and a cellReservedForOtherUse/cellReservedForFutureUse-r16 in a system information block 1 (SIB1); and checking, by the wireless device, whether the network can be accessed based on an identity of the indoor small base station.

Clause 9. The method of wireless communication of clause 1, wherein after receiving an indoor small base station selection indication from the NAS layer, the AS uses the base station information in a system information when executing a cell selection or a cell reselection.

Clause 10. The method of wireless communication of clause 9, further comprising: providing, by the wireless device, a frequency indicating a highest priority indoor small base station.

Clause 11. The method of wireless communication of clause 10, further comprising: executing, by the wireless device, a cell reselection based on the indoor small base station supporting an indication for each frequency including an intra frequency and an inter frequency.

Clause 12. The method of wireless communication of clause 1, further comprising: receiving, by the wireless device, access control parameters of different types of wireless devices from the indoor small base station; and determining, by the wireless device, a type for the wireless device based on a configuration of the wireless device or an upper layer indication; and adopting, by the wireless device, the corresponding access control parameters based on the type Clause 13. The method of wireless communication of clause 12, wherein the type is one of: a first type of wireless device capable of sharing a same public land mobile network (PLMN) as a network node and the wireless device subscribes to the network node, a second type of wireless device capable of forming a visited public land mobile network (VPLMN) and the wireless device subscribe to the network node, a third type of wireless device capable of accessing the network node and the wireless device does not subscribe to the network node, or a fourth type of wireless device without a subscriber identity module (SIM) card.

Clause 14. The method of wireless communication of clause 12, wherein the wireless device determines the type based on whether the wireless device has a password of the indoor small base station or whether the wireless device has authorization to enter the indoor small base station.

Clause 15. The method of wireless communication of clause 13, further comprising: assigning, by the wireless device, the type 3 to the wireless device when the wireless device does not have a password for the indoor small base station or the wireless device has no authorization to enter this indoor small base station.

Clause 16. The method of wireless communication of clause 12, wherein the wireless device determines the type for the wireless device is type 3 after a residential gateway (RG) authentication failure.

Clause 17. The method of wireless communication of clause 12, wherein the UE selects an access control parameter once the wireless device type is determined and executed an access control based on the access control parameters for the wireless device type.

Clause 18. The method of wireless communication of clause 12, further comprising: determining, by a wireless device, a target node type information based on the upper layer indication and the configuration; and sending, by the wireless device, the target node type to a network node.

Clause 19. The method of wireless communication of clause 18, wherein the target node type is a 5G core network or a residential gateway.

Clause 20. The method of wireless communication of clause 18, wherein the UE sends the target node type to the network by an AS signal or a NAS signal.

Clause 21. The method of wireless communication of clause 20, wherein the AS signal is a radio resource control (RRC) request message, an RRCSetupComplete message, an RRCResumeRequest message, an RRCResumeComplemessage, or an RRCReconfigurationComplete message.

Clause 22. The method of wireless communication of clause 21, further comprising: indicating the target node type as a cause in the request message, or in the RRCResumeRequest message.

Clause 23. The method of wireless communication of clause 18, further comprising: indicating, by the wireless device, in a NAS message or an AS message explicitly or implicitly that the wireless device has no subscription.

Clause 24. The method of wireless communication of clause 1, further comprising: downloading or saving, by the wireless device, information for authentication; and authenticating, by the wireless device, the network based on a key including a downloaded key or a stored key.

Clause 25. The method of wireless communication of clause 24, wherein the wireless device has no SIM card, no USIM card, and no other SIM type.

Clause 26. The method of wireless communication of clause 24, wherein the wireless device has a capability to save a preconfigured key or to download the preconfigured key from the network.

Clause 27. The method of wireless communication of clause 24, wherein the key is a root key used to derive other keys.

Clause 28. The method of wireless communication of clause 24, wherein the key can be a cipher key (CK) and an integrity key (IK).

Clause 29. The method of wireless communication of clause 1, further comprising: determining, by the wireless device, a security header for a residential gateway based on a stored security context; and including, by the wireless device, the security header for the residential gateway after establishing a connection with the residential gateway.

Clause 30. A method of wireless communication, comprising: setting, by a network node in system information, indoor small base station information; and transmitting, from the network node to a wireless device, the system information indicating the network node is the indoor small base station.

Clause 31. The method of wireless communication of clause 30, wherein an indication that the network node is the indoor small base station is a one-bit indication or a name string for the indoor small base station.

Clause 32. The method of wireless communication of clause 31, further comprising: broadcasting the network name or the one-bit indication in a first system information block (SIB1) for fast access.

Clause 33. The method of wireless communication of clause 31, further comprising: setting legacy system information comprising a cellBarred in a MIB or a cellReservedForOtherUse/cellReservedForFutureUser16 in SIB1 as true to bar the wireless device that is not capable of interoperating with the indoor small base station.

Clause 34. The method of wireless communication of clause 31, further comprising: including an indoor small base station supporting indication in system information or a dedicated RRC signaling at least one frequency.

Clause 35. The method of wireless communication of clause 30, further comprising: setting, by a network node, access control parameters for different wireless device types; and transmitting, by the network node to a wireless device, the access control parameters.

Clause 36. The method of wireless communication of clause 35, wherein the different wireless device types comprises: a first type of wireless device capable of sharing a same public land mobile network (PLMN) as a network node and the wireless device subscribes to the network node, a second type of wireless device capable of forming a visited public land mobile network (VPLMN) and the wireless device subscribe to the network node, a third type of wireless device capable of accessing the network node and the wireless device does not subscribe to the network node, or a fourth type of wireless device without a subscriber identity module (SIM) card.

Clause 37. The method of wireless communication of clause 35, further comprising: releasing one or more wireless devices of the third type during network congestion.

Clause 38. The method of wireless communication of clause 37, further comprising: determining, based on an authentication result, that the wireless device is the third type.

Clause 39. The method of wireless communication of clause 30, further comprising: receiving, by the network node from the wireless device, a message including a target node type indication; and determining, by the network node, the target node type based on the received message; and processing or forwarding, by the network node, the received message.

Clause 40. The method of wireless communication of clause 39, wherein the target node type is a 5G core network or a residential gateway, and wherein when the target node type is a 5G core network the network node forwards the message to the 5G core network.

Clause 41. The method of wireless communication of clause 39, wherein the received message including the target node type is a NAS message or an AS message.

Clause 42. The method of wireless communication of clause 41, wherein the AS message is an RRC request message, an RRCSetupComplete message, an RRCResumeRequest message, an RRCResumeComplemessage, or an RRCReconfigurationComplete message.

Clause 43. The method of wireless communication of clause 41, further comprising: indicating the target node type as a cause in a request message or an RRCResumeRequest message.

Clause 44. The method of wireless communication of clause 39, further comprising: receiving an indication from the wireless device in a NAS message or an AS message explicitly or implicitly that the wireless device has no subscription.

Clause 45. The method of wireless communication of clause 30, further comprising: downloading or saving, by a network node, a key for authentication; authenticating, by the network node, a core network based on a downloaded key or a stored key.

Clause 46. The method of wireless communication of clause 45, wherein the network node saves a preconfigured key or downloads the preconfigured key from the core network.

Clause 47. The method of wireless communication of clause 45, wherein the key is a root key used to derive other keys.

Clause 48. The method of wireless communication of clause 45, wherein the key is a cipher key (CK) and the integrity key (IK).

Clause 49. The method of wireless communication of any of clauses 30 to 48, wherein the network node is a small indoor base station or a residential gateway.

Clause 50. The method of wireless communication of clause 30, further comprising: receiving, by a residential gateway, a security header for the residential gateway from a wireless device message; and checking, by the residential gateway, an integrity protection of the wireless device based on the security header.

Clause 51. The method of wireless communication of clause 30, further comprising: authenticating, by a residential gateway, the wireless device via an indoor small base station; and selectively relaying, based on a result of the authenticating, data by the residential gateway, data from the wireless device to a core network.

Clause 52. The method of wireless communication of clause 51, wherein the wireless device is a third type of wireless device that does not have a password with the indoor small base station or a residential gateway or has failed authentication at the residential gateway.

Clause 53. The method of wireless communication of clause 30, further comprising: authenticating, by a residential gateway, the wireless device via an indoor small base station; and executing based on the authenticating a subscription download from a core network, wherein the subscription download is transferred to the wireless device; and completing a registration of the wireless device at the residential gateway using the subscription download and a default key or a preconfigured key.

Clause 54. The method of wireless communication of clause 53, wherein the wireless device does not include a SIM card.

Clause 55. The method of wireless communication of clause 30, further comprising: receiving, by a residential gateway from a core network, a request for authentication; transmitting, by the residential gateway to the core network, an authentication response message based on a cipher key (CK), an integrity key (IK), and a response token (RES); and transmitting, by the residential gateway to the wireless device, a previous key encrypted using the CK and the IK.

Clause 56. The method of wireless communication of clause 55, wherein the residential gateway saves one or more of the cipher key (CK) and the integrity key (IK), or an encryption key for authentication.

Clause 57. The method of wireless communication of any of clauses 1 to 56, wherein the indoor small base station is an outdoor base station of a cellular network.

Clause 58. An apparatus configured to perform any of clauses 1 to 57.

Clause 59. A computer-readable medium including instructions that when executed perform any of clauses 1 to 57.

In the technical solutions described herein in clause format, the network node may be a network device or a network-side equipment such as a base station. FIG. 8 shows an example hardware platform for implementing the network node or a wireless node.

It will be appreciated that the present document discloses techniques that can be embodied in various embodiments to establish and manage wireless network including a residential gateway and a small indoor base station. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

What is claimed is:

1. A method of wireless communication, comprising:

receiving, at a wireless device from a base station, system information that includes base station information comprising an identifier, wherein the base station information is a one-bit indication that indicates that the base station is an indoor small base station;

determining, at the wireless device, whether the indoor small base station can be accessed based on the identifier; and triggering, by the wireless device, a registration procedure or a service request procedure with a network based on the identifier.

2. The method of wireless communication of claim 1, wherein enabling communication between the wireless device and the indoor small base station is performed after determining that the wireless device is capable of interoperating with the indoor small base station.

3. The method of wireless communication of claim 1, wherein an access stratum (AS) layer of the wireless device determines that the wireless device is capable of interoperating with the indoor small base station after receiving an indoor small base station selection indication from a non-access stratum (NAS) layer.

4. The method of wireless communication of claim 3, wherein after receiving an indoor small base station selection indication from the NAS layer, the AS uses the base station information in a system information when executing a cell selection or a cell reselection.

5. The method of wireless communication of claim 1, further comprising:

ignoring, by a wireless device capable of interoperating with the indoor small base station, a legacy field check comprising a cellBarred in a master information block (MIB); and a cellReservedForOtherUse/cellReservedForFutureUse-r16 in a system information block 1 (SIB1); and checking, by the wireless device, whether the network can be accessed based on an identity of the indoor small base station.

6. The method of wireless communication of claim 1, further comprising:

receiving, by the wireless device, access control parameters of different types of wireless devices from the indoor small base station; and determining, by the wireless device, a type for the wireless device based on a configuration of the wireless device or an upper layer indication; and adopting, by the wireless device, corresponding access control parameters based on the type, wherein the wireless device determines the type for the wireless device is type 3 after a residential gateway (RG)

authentication failure, wherein the wireless device selects an access control parameter once the wireless device type is determined and executed an access control based on the access control parameters for the wireless device type.

7. The method of wireless communication of claim 6, wherein the wireless device determines the type based on whether the wireless device has a password of the indoor small base station or whether the wireless device has authorization to enter the indoor small base station.

8. The method of wireless communication of claim 6, further comprising:

determining, by a wireless device, a target node type information based on the upper layer indication and the configuration; and sending, by the wireless device, the target node type to a network node, wherein the wireless device sends the target node type to the network by an AS signal or a NAS signal, wherein the AS signal is a radio resource control (RRC) request message, an RRCSetupComplete message, an RRCResumeRequest message, an RRCResumeComplemessage, or an RRCReconfigurationComplete message.

9. A method of wireless communication, comprising:

setting, by a network node in system information, indoor small base station information as a one-bit indication;

transmitting, from the network node to a wireless device, the system information indicating the network node is the indoor small base station; and performing, after the transmitting, a registration procedure or a service request procedure with the wireless device based on the one-bit indication.

10. The method of wireless communication of claim 9, further comprising:

setting legacy system information comprising a cell-Barred in a MIB or a cellReservedForOtherUse/cellReservedForFutureUse-r16 in SIB1 as true to bar the wireless device that is not capable of interoperating with the indoor small base station.

11. The method of wireless communication of claim 9, further comprising:

setting, by a network node, access control parameters for different wireless device types; and transmitting, by the network node to a wireless device, the access control parameters.

12. The method of wireless communication of claim 11, wherein the different wireless device types comprise:

a first type of wireless device capable of sharing a same public land mobile network (PLMN) as a network node and the wireless device subscribes to the network node, a second type of wireless device capable of forming a visited public land mobile network (VPLMN) and the wireless device subscribe to the network node, a third type of wireless device capable of accessing the network node and the wireless device does not subscribe to the network node, or a fourth type of wireless device without a subscriber identity module (SIM) card.

13. The method of wireless communication of claim 9, further comprising:

receiving, by the network node from the wireless device, a message including a target node type indication; and determining, by the network node, the target node type based on the received message; and processing or forwarding, by the network node, the received message.

14. The method of wireless communication of claim 13, wherein the received message including the target node type is a NAS message or an AS message, wherein the AS message is an RRC request message, an RRCSetupComplete message, an RRCResumeRequest message, an RRCResumeComplemessage, or an RRCReconfigurationComplete message.

15. The method of wireless communication of claim 9, further comprising:

downloading or saving, by a network node, a key for authentication;

authenticating, by the network node, a core network based on a downloaded key or a stored key, wherein the network node saves a preconfigured key or downloads the preconfigured key from the core network, wherein the key is at least one of: 1) a root key used to derive other keys or 2) a cipher key (CK) and an integrity key (IK).

16. The method of wireless communication of claim 9, further comprising:

authenticating, by a residential gateway, the wireless device via an indoor small base station; and executing based on the authenticating a subscription download from a core network, wherein the subscription download is transferred to the wireless device; and completing a registration of the wireless device at the residential gateway using the subscription download and a default key or a preconfigured key.

17. An apparatus comprising a processor configured to perform a method comprising:

receiving, at a wireless device, from a base station, system information that includes base station information comprising an identifier, wherein the base station information is a one-bit indication that indicates that the base station is an indoor small base station;

determining, at the wireless device, whether the indoor small base station can be accessed based on the identifier; and triggering, by the wireless device, a registration procedure or a service request procedure with a network based on the identifier.

* * * * *